US010155528B2

(12) United States Patent
Zhong et al.

(10) Patent No.: US 10,155,528 B2
(45) Date of Patent: Dec. 18, 2018

(54) CHILD STROLLER APPARATUS

(71) Applicant: Wonderland Nurserygoods Company Limited, Tuen Mun, N.T. (HK)

(72) Inventors: Zhi-ren Zhong, Tuen Mun (CN); Yan-ge Hu, Tuen Mun (CN)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 15/484,378

(22) Filed: Apr. 11, 2017

(65) Prior Publication Data

US 2017/0297600 A1    Oct. 19, 2017

(30) Foreign Application Priority Data

Apr. 13, 2016 (CN) .......................... 2016 1 0230758

(51) Int. Cl.
*B62B 7/08* (2006.01)
*B62B 7/06* (2006.01)
*B62B 7/00* (2006.01)

(52) U.S. Cl.
CPC .............. *B62B 7/083* (2013.01); *B62B 7/062* (2013.01); *B62B 7/006* (2013.01); *B62B 2205/20* (2013.01)

(58) Field of Classification Search
CPC  B62B 7/06; B62B 7/062; B62B 7/064; B62B 7/083; B62B 9/20; B62B 2205/20; B62B 2205/22; B62B 2205/003
See application file for complete search history.

(56) References Cited

U.S. PATENT DOCUMENTS

| | | | |
|---|---|---|---|
| 5,028,061 A * | 7/1991 | Hawkes | .................... B62B 7/04 280/47.4 |
| 5,775,460 A * | 7/1998 | Stone | ........................ E06C 1/12 16/354 |
| 6,102,431 A * | 8/2000 | Sutherland | .............. B62B 7/062 280/47.17 |

(Continued)

FOREIGN PATENT DOCUMENTS

| | | |
|---|---|---|
| EP | 2703250 A2 | 5/2014 |
| EP | 2799308 A2 | 5/2014 |
| EP | 2949542 A2 | 2/2015 |

OTHER PUBLICATIONS

The Search Report of co-pending EP Patent Application No. 17 166 462.6 dated Nov. 13, 2017.

*Primary Examiner* — Frank B Vanaman
(74) *Attorney, Agent, or Firm* — Daniel A Tallitsch; Baker McKenzie LLP

(57) ABSTRACT

A child stroller apparatus includes a handle frame having a first side segment fixedly connected with a first coupling part, a front leg frame having a second side segment fixedly connected with a second coupling part, a rear leg frame having a third side segment fixedly connected with a shell, the third side segment being respectively connected pivotally with the first and second coupling parts, a linking member received at least partially inside the shell and respectively connected pivotally with the first and second coupling parts about two different pivot axes, the handle frame and the front leg frame being thereby rotationally linked to each other, and a latch disposed adjacent to the first coupling part, the latch being operable to rotationally lock the handle frame with respect to the rear leg frame so as to lock the infant stroller apparatus in an unfolded state.

15 Claims, 21 Drawing Sheets

(56) References Cited

U.S. PATENT DOCUMENTS

| | | | |
|---|---|---|---|
| 2008/0088116 A1* | 4/2008 | Den Boer | B62B 7/062 280/650 |
| 2009/0121455 A1* | 5/2009 | Kretschmer | B62B 7/062 280/642 |
| 2013/0113185 A1* | 5/2013 | Zehfuss | B62B 3/02 280/647 |
| 2015/0291200 A1 | 10/2015 | Taylor et al. | |
| 2015/0344058 A1* | 12/2015 | Liu | E05D 11/1007 280/647 |

* cited by examiner

CHILD STROLLER APPARATUS

CROSS-REFERENCE TO RELATED APPLICATION(S)

This application claims priority to China Patent Application No. 201610230758.3 filed on Apr. 13, 2016.

BACKGROUND

1. Field of the Invention

The present invention relates to child stroller apparatuses.

2. Description of the Related Art

Caregivers usually rely on a stroller apparatus to transport babies and children. A stroller apparatus is typically constructed from a rigid frame that can be collapsed for convenient storage or transport and unfolded for use. The construction adopted for the folding mechanism of the stroller apparatus plays an important role in the design of the stroller since it has to be safe and convenient to handle in different situations while not affecting the appealing aesthetics of the stroller.

In some existing construction, the stroller frame may typically include a front leg, a rear leg and a handle frame pivotally connected with one another via multiple joint structures. The multiple joint structures may be dispersed at different locations on each of the left and right sides of the stroller frame, which may result in a stroller apparatus that requires two hands to operate and is inconvenient to fold and unfold.

Therefore, there is a need for a child stroller apparatus that can be convenient to fold and unfold, and address at least the foregoing issues.

SUMMARY

The present application describes a child stroller apparatus that is easy to collapse and unfold, and has a compact structure. In one embodiment, the child stroller apparatus can include a handle frame having a first side segment fixedly connected with a first coupling part, a front leg frame having a second side segment fixedly connected with a second coupling part, a rear leg frame having a third side segment fixedly connected with a shell, the third side segment being respectively connected pivotally with the first and second coupling parts, a linking member received at least partially inside the shell and respectively connected pivotally with the first and second coupling parts about two different pivot axes, the handle frame and the front leg frame being thereby rotationally linked to each other, and a latch disposed adjacent to the first coupling part, the latch being operable to rotationally lock the handle frame with respect to the rear leg frame so as to lock the infant stroller apparatus in an unfolded state.

DETAILED DESCRIPTION OF THE EMBODIMENTS

Figure 1:
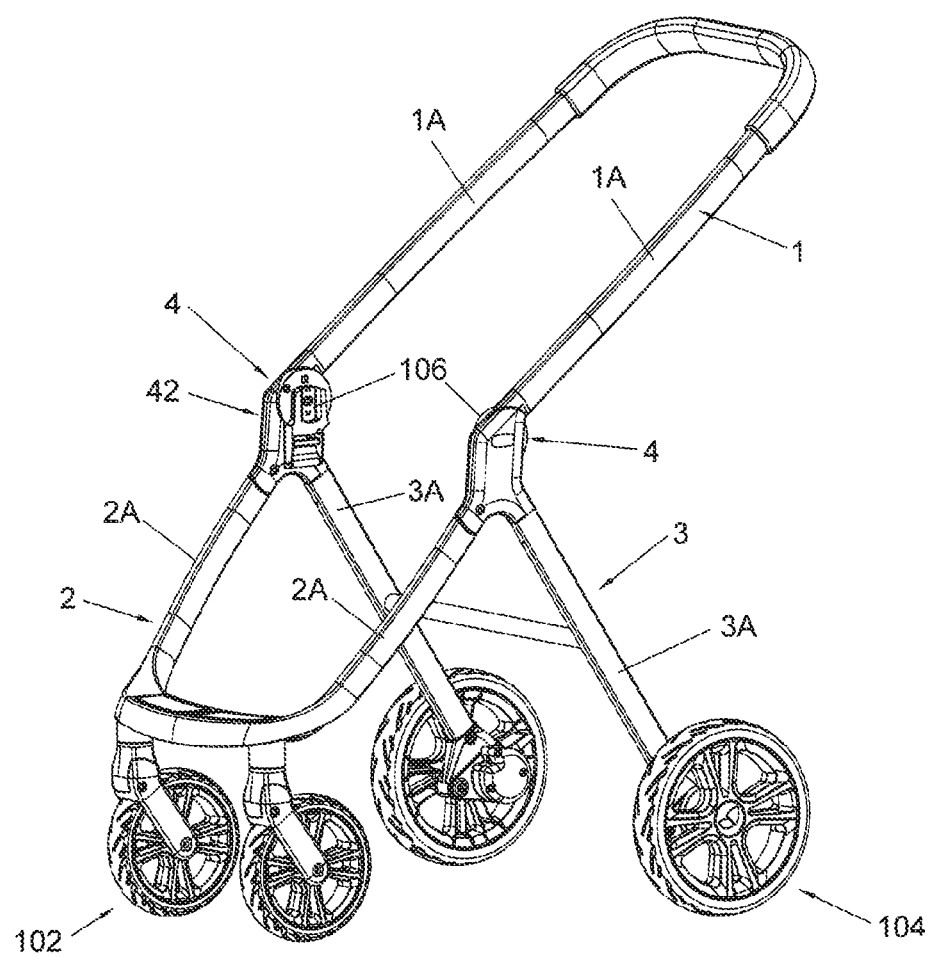
FIG. 1 is a perspective view illustrating an embodiment of a child stroller apparatus in an unfolded state for use.

FIGS. 1-6 are schematic views illustrating an embodiment of a child stroller apparatus 100. The child stroller apparatus 100 can include a handle frame 1, a front leg frame 2, a rear leg frame 3 and two joint structures 4. The front and rear leg frames 2 and 3 are respectively provided with wheel assemblies 102 and 104. Each of the handle frame 1, front leg frame 2 and rear leg frame 3 can have a generally symmetrical construction including two parallel side segments respectively disposed at a left and a right side of the child stroller apparatus 1, i.e., two side segments 1A for the handle frame 1, two side segments 2A for the front leg frame 2, and two side segments 3A for the rear leg frame 3. The side segments 1A, 2A and 3A can be, for example, tube portions.

The side segments 1A, 2A and 3A at each of the left and right sides are connected with one joint structure 4. The two joint structures 4 on the left and right sides are generally similar in construction, and allow relative rotation between the handle frame 1, front leg frame 2 and rear leg frame 3 for folding and unfolding the child stroller apparatus 100.

Figure 2:
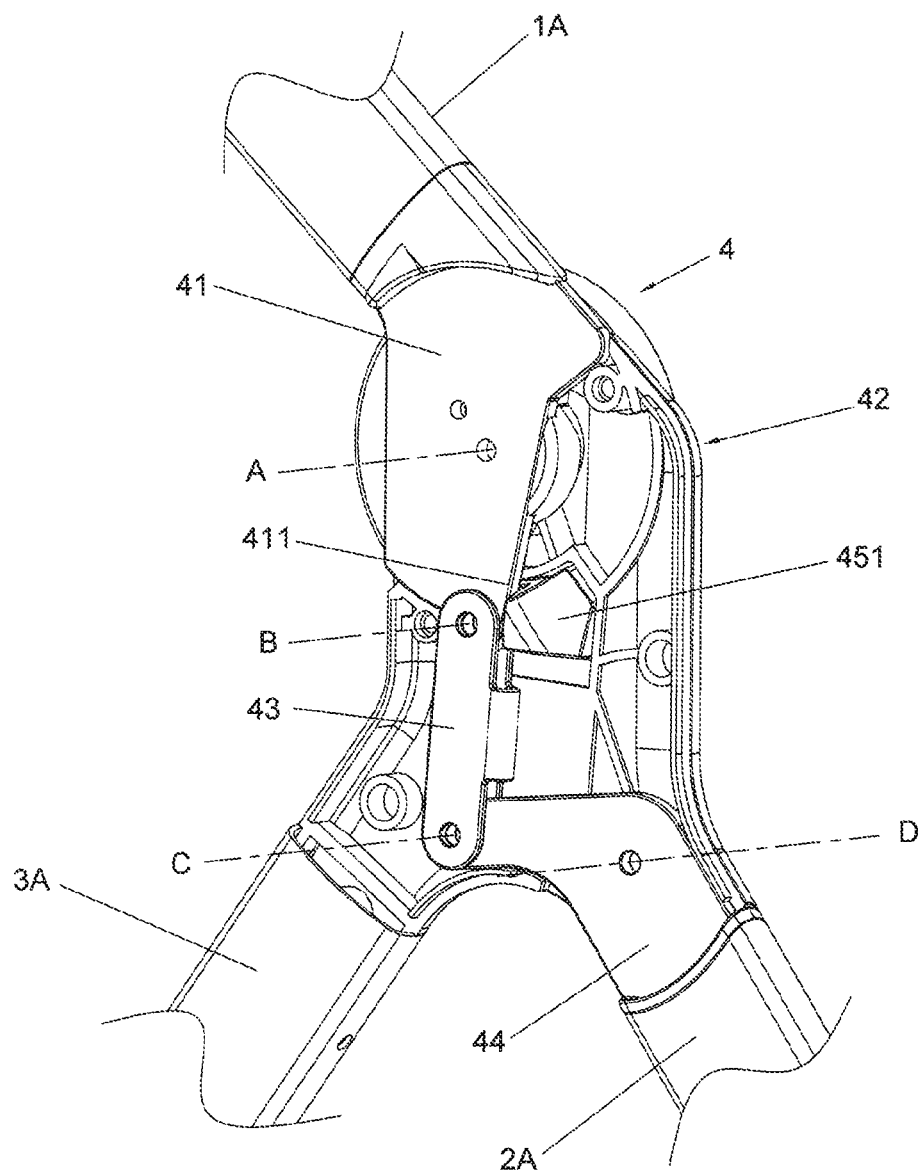
FIG. 2 is a schematic view illustrating some inner construction details of a joint structure used in the child stroller apparatus shown in FIG. 1, the representation illustrated in FIG. 2 being from an outer side of the child stroller apparatus.
Figure 3:
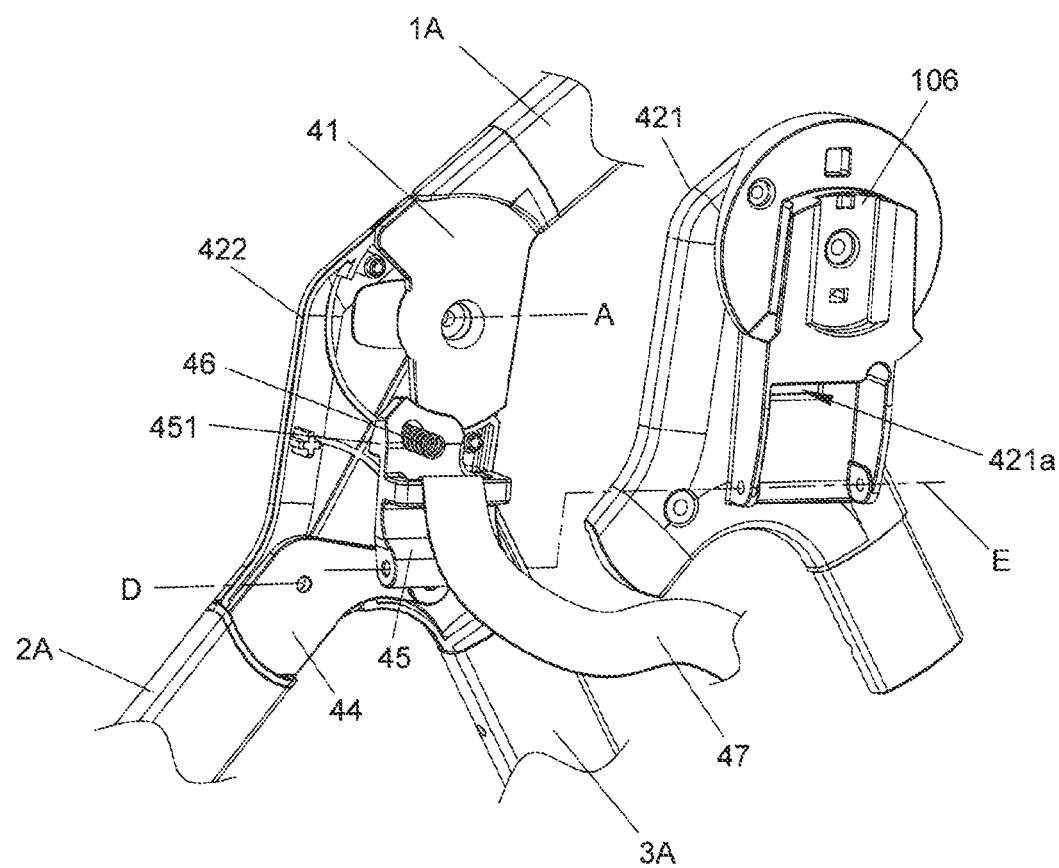
FIG. 3 is a schematic view illustrating some inner construction details of the joint structure represented from an inner side of the child stroller apparatus.
Figure 4:
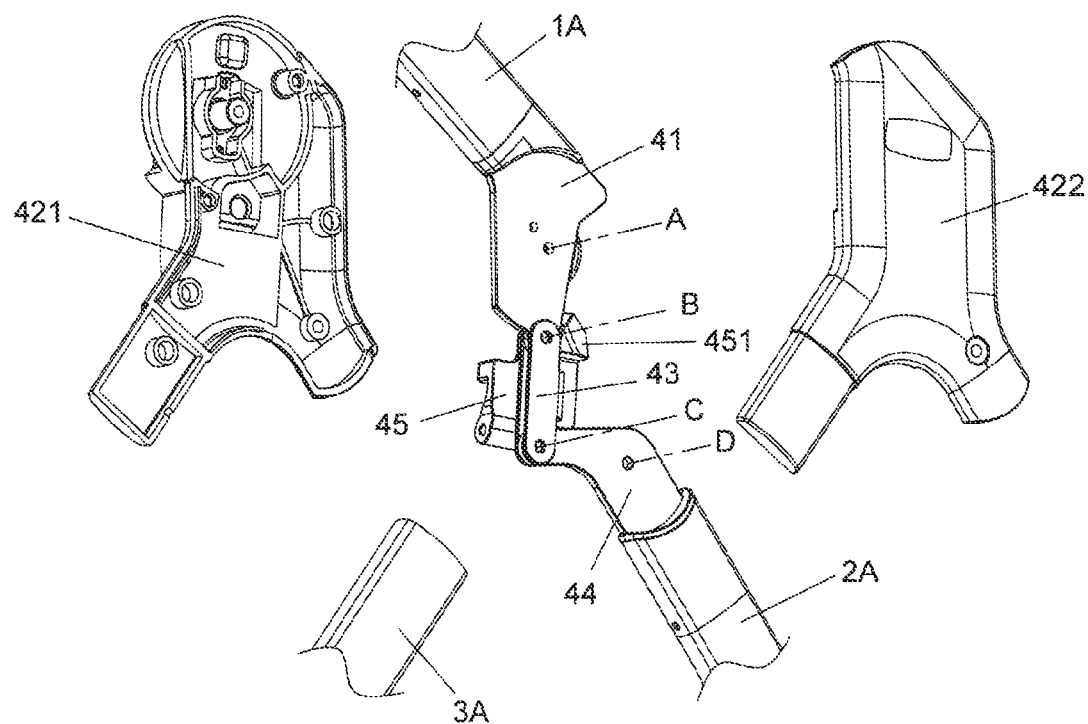
FIG. 4 is an exploded view illustrating the joint structure of the child stroller apparatus.
Figure 5:
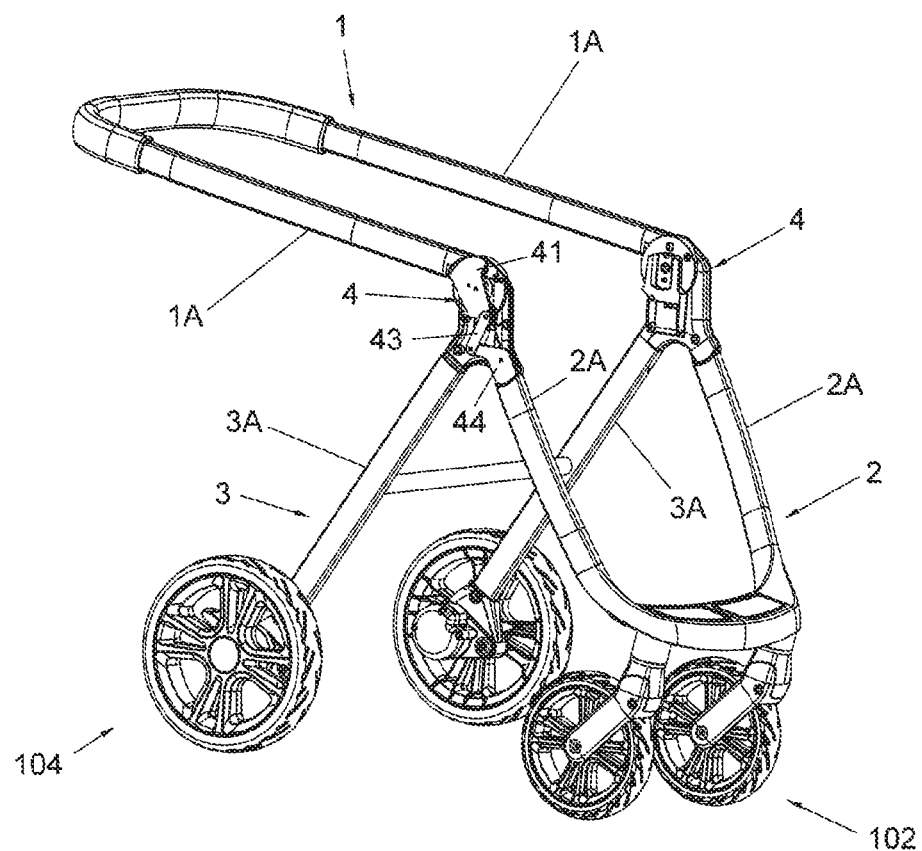
FIG. 5 is a schematic view illustrating the child stroller apparatus and the joint structure thereof in an intermediate state between a fully folded and fully unfolded state.

Referring to FIGS. 2-4, the joint structure 4 can include two coupling parts 41 and 44 that are respectively connected fixedly with the side segment 1A of the handle frame 1 and the side segment 2A of the front leg frame 2. The coupling parts 41 and 44 can include, e.g., plate elements made of a metallic material, and can be respectively provided at the ends of the side segments 1A and 2A. The joint structure 4 can further include a shell 42 that is fixedly connected with the side segment 3A of the rear leg frame 3 and is comprised of an inner and an outer shell portion 421 and 422 fixedly assembled with each other, the inner shell portion 421 facing an inner side of the child stroller apparatus 100 and the outer shell portion 422 facing an outside thereof. Two seat mounts 106 on which a child seat can be detachably installed may be respectively attached fixedly to the two shells 42, e.g., on the inner shell portions 421 thereof. The shell 42 can have a hollow interior in which the coupling parts 41 and 44 are assembled and can be at least partially received. More specifically, the coupling part 41 of the side segment 1A can be pivotally connected with the shell 42 about a pivot axis A, and the coupling part 44 of the side segment 2A can be pivotally connected with the shell 42 about another pivot axis D, the two pivot connections about the pivot axes A and D being received at least partially in the shell 42. The two pivot connections about the pivot axes A and D can be achieved, for example, by providing shafts in the shell 42 that are respectively connected pivotally with the coupling parts 41 and 44, or by providing a coupling part (e.g., comprised of a metallic plate) inside the shell 42 that is fixedly connected with the side segment 3A of the rear leg frame 3 and is respectively connected pivotally with the coupling parts 41 and 44 about the pivot axes A and D. The two pivot axes A and D are spaced apart from each other, and extend transversally parallel from the left to the right side of the child stroller apparatus 100. The side segment 3A of the rear leg frame 3 is thereby respectively connected pivotally with the coupling part 41 on the side segment 1A of the handle frame 1 and the coupling part 44 on the side segment 2A of the front leg frame 2.

The coupling parts 41 and 44 are linked to each other via a linking member 43, which can be received at least partially inside the shell 42. The linking member 43 can be a unitary part having an elongated shape. For example, the linking member 43 may be a rod, a bar, and the like. A first end portion of the linking member 43 can be pivotally connected with the coupling part 41 about a pivot axis B distinct from the pivot axis A, and a second end portion of the linking member 43 opposite to its first end portion can be pivotally connected with the coupling part 44 about another pivot axis C distinct from the pivot axis D, the two pivot connections about the pivot axes B and C being received in the shell 42. The two pivot axes B and C are spaced apart from each other, and extend transversally parallel from the left to the right side of the child stroller apparatus 100.

Figure 6:
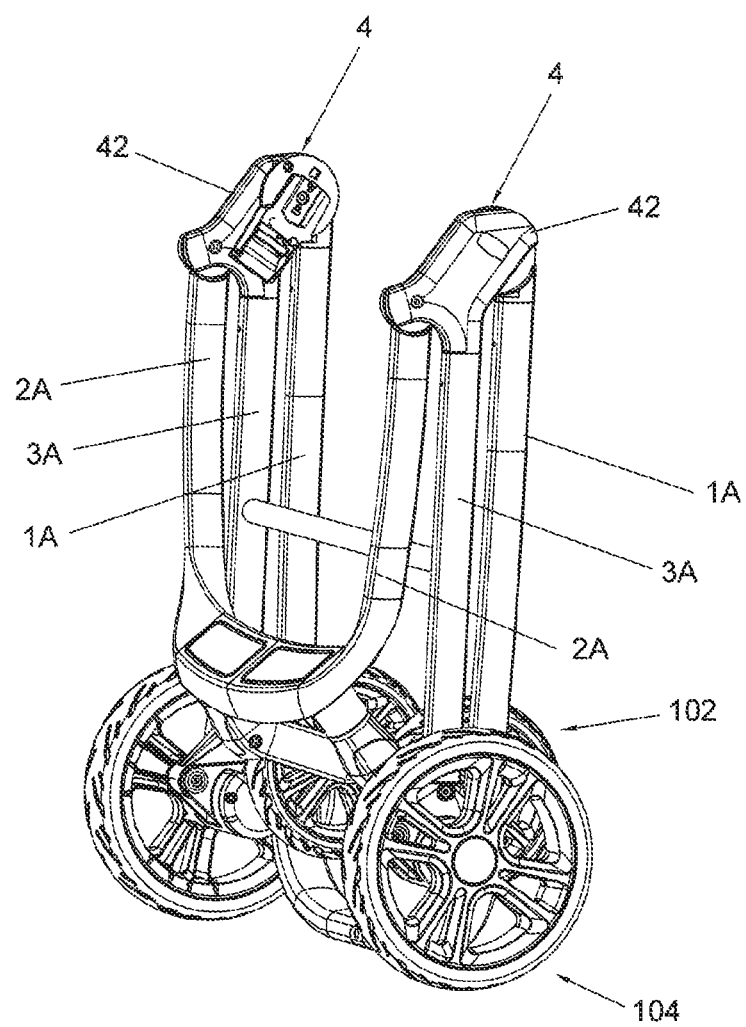
FIG. 6 is a perspective view illustrating the child stroller apparatus in a fully folded state.

With the aforementioned assembly, the handle frame 1 and the coupling part 41 attached thereto are rotatable about the pivot axis A relative to the rear leg frame 3 and the shell 42, and the front leg frame 2 and the coupling part 44 attached thereto are rotatable about the pivot axis D relative to the rear leg frame 3 and the shell 42, the handle frame 1 and the front leg frame 2 being rotationally linked to each other owing to the connection of the linking member 43. Accordingly, the handle frame 1 and the front leg frame 2 can rotate in unison in opposite directions either toward the rear leg frame 3 for folding the child stroller apparatus 100, or away from the rear leg frame 3 for unfolding the child stroller apparatus 100. FIG. 1 shows the child stroller apparatus 100 in an unfolded state for use, and FIG. 6 shows the child stroller apparatus 100 in a fully folded state. The linking member 43 can remain at least partially inside the shell 42 during rotation of the handle frame 1 and the front leg frame 2 between the folded and unfolded states, which can provide a compact and safe construction for the joint structure 4.

Referring to FIGS. 2-4, a latch 45 may be assembled adjacent to the shell 42 for locking the child stroller apparatus 100 in the unfolded state. For example, the latch 45 may be disposed adjacent to the coupling part 41 and pivotally connected with the shell 42 (e.g., the inner shell portion 421 thereof) about a pivot axis E. The latch 45 can engage with the coupling part 41 to rotationally lock the handle frame 1 with respect to the rear leg frame 3, thereby locking the child stroller apparatus 100 in the unfolded state. Moreover, the latch 45 can disengage from the coupling part 41 to allow rotation of the handle frame 1 for folding the child stroller apparatus 100. The latch 45 may be pivotally connected on an outer side of the inner shell portion 421 with the pivot axis E thereof extending from a front to a rear of the child stroller apparatus 100, and can have a latching portion 451 that extends through a slot 421a provided on the inner shell portion 421 into the interior of the shell 42. The latching portion 451 can engage with a side edge 411 of the coupling part 41 to block a folding rotation of the handle frame 1 about the pivot axis A, and disengage from the side edge 411 for folding rotation of the handle frame 1 about the pivot axis A.

Referring to FIG. 3, the latch 45 can be connected with a spring 46, which can bias the latch 45 toward a locking state for engagement with the coupling part 41 of the handle frame 1. The spring 46 may exemplary be a compression spring having two ends respectively connected with the latch 45 and the shell 42.

The latch 45 can further be connected with a release actuator 47, which is operable to urge the latch 45 to move to an unlocking state and disengage from the coupling part 41 of the handle frame 1. According to an example of construction, the release actuator 47 can extend transversally across a width of the child stroller apparatus 100, and may include a flexible strap or web. The release actuator 47 may be pulled upward to cause rotation of the latch 45 against the biasing force of the spring 46 toward its unlocking state, thereby allowing folding of the child stroller apparatus 100. According to an example of construction, the same assembly of the latch 45 and spring 46 can be respectively provided at the left and right side, and the release actuator 47 can be oppositely connected with the two latches 45 so that it can be operable to drive concurrent unlocking of the two latches 45.

Exemplary operation of the child stroller apparatus 100 is described hereinafter with reference to FIGS. 1-6. When the child stroller apparatus 100 is in the unfolded state, the side segment 1A of the handle frame 1 and the side segment 2A of the front leg frame 2 can respectively project rearward and forward from an upper and a lower portion of the shell 42 at each of the left and right sides. Moreover, the latch 45 biased by the spring 46 can engage with the side edge 411 of the coupling part 41, which can block downward folding rotation of the handle frame 1 about the pivot axis A relative to the rear leg frame 3. The child stroller apparatus 100 can be thereby locked in the unfolded state.

For folding the child stroller apparatus 100, a caregiver can pull the release actuator 47 upward with a single hand, which can urge the latch 45 to rotate relative to the shell 42 against the biasing force of the spring 46 for disengaging from the side edge 411 of the coupling part 41. The handle frame 1 is thereby unlocked and can be rotated downward about the pivot axis A, which can drive the front leg frame 2 to rotate in unison about the pivot axis D toward the rear leg frame 3 owing to the linking member 43. The side edge 411 of the coupling part 41 can travel past the latching portion 451 of the latch 45 during the folding rotation of the handle frame 1. The handle frame 1 and the front leg frame 2 can thereby rotate relative to the shell 42 and fold toward the rear leg frame 3 at two opposite sides thereof. When the child stroller apparatus 100 is switched between the unfolded state and the folded state, the linking member 43 can remain at least partially inside the shell 42, the two pivot connections of the linking member 43 about the pivot axes B and C moving and remaining inside the shell 42. Most of the coupling parts 41 and 44 can also remain inside the shell 42 when the child stroller apparatus 100 is switched between the unfolded state and the folded state. This can add protection, and provide a compact and robust construction for the joint structure 4.

FIGS. 7-10 are schematic views illustrating another embodiment of a child stroller apparatus 200. The child stroller apparatus 200 has a frame structure generally similar to that described previously, including the handle frame 1 having two side segments 1A, the front leg frame 2 having two side segments 2A, and the rear leg frame 3 having two side segments 3A. The side segments 1A, 2A and 3A at each of the left and right sides are connected with one joint structure 5. The two joint structures 5 on the left and right sides are generally similar in construction, and allow relative rotation between the handle frame 1, front leg frame 2 and rear leg frame 3 for folding and unfolding the child stroller apparatus 100.

Like previously described, the joint structure 5 can include the shell 42 that is fixedly attached to the side segment 3A of the rear leg frame 3 and is pivotally connected with the side segment 1A of the handle frame 1 and the side segment 2A of the front leg frame 2 about two distinct pivot axes (e.g., via the assembly of the coupling parts 41 and 44 like previously described and shown in FIG. 2), and the handle frame 1 and front leg frame 2 may be rotationally linked to each other (e.g., via the linking member 43 like described previously and shown in FIG. 2).

At each of the left and right sides, the latch 45 is likewise assembled with the shell 42 for locking the child stroller apparatus 200 in the unfolded state. The latch 45 can be engaged (e.g., with the coupling part 41 as previously described and shown in FIGS. 2 and 3) for blocking folding rotation of the handle frame 1 relative to the shell 42, and disengaged to allow folding rotation of the handle frame 1. The latch 45 may also be connected with a spring (not shown in FIGS. 8 and 9) adapted to bias the latch 45 to the locking state.

In addition, the latch 45 may be connected with a release actuator 51. The release actuator 51 can be a rigid part having a ramp surface 51a, and may be movably assembled with the shell 42. For example, the release actuator 51 may be assembled with the shell 42 for rotational movements. The latch 45 can have a ramp surface 45a that is in sliding contact with the ramp surface 51a of the release actuator 51. Owing to the interaction between the ramp surfaces 45a and 51a, an upward displacement of the release actuator 51 can result in a rotation of the latch 45 for unlocking the handle frame 1 and thereby allow its rotation for folding the child stroller apparatus 200. For facilitating the unlocking operation, a transversal bar assembly 53 may be fixedly connected with the release actuator 51. The transversal bar assembly 53 may have two opposite ends respectively attached with the two release actuators 51 on the left and right sides. A caregiver can grasp the transversal bar assembly 53 with one hand, and lift it for unlocking the two latches 45 in a concurrent manner.

Figure 7:
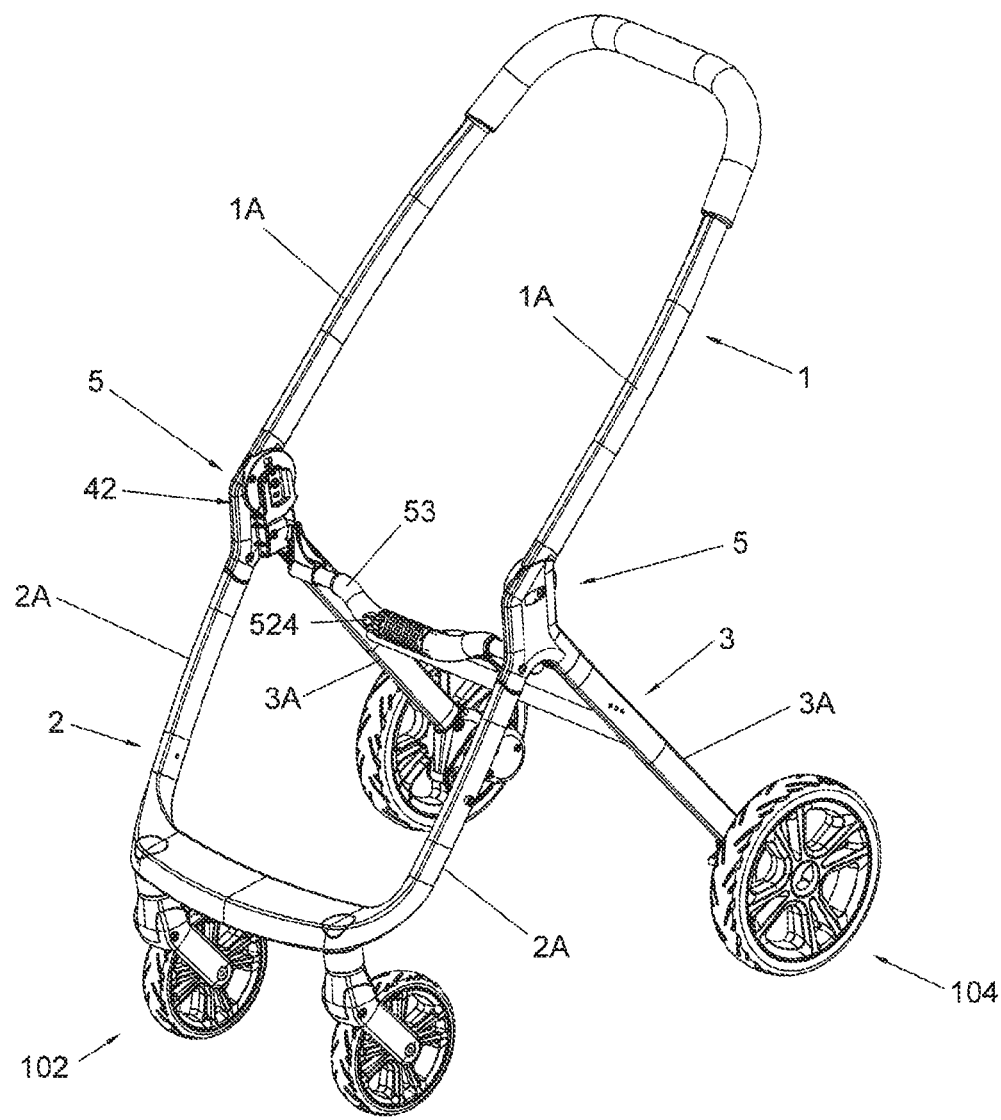
FIG. 7 is a perspective view illustrating another embodiment of a child stroller apparatus in an unfolded state for use.
Figure 8:
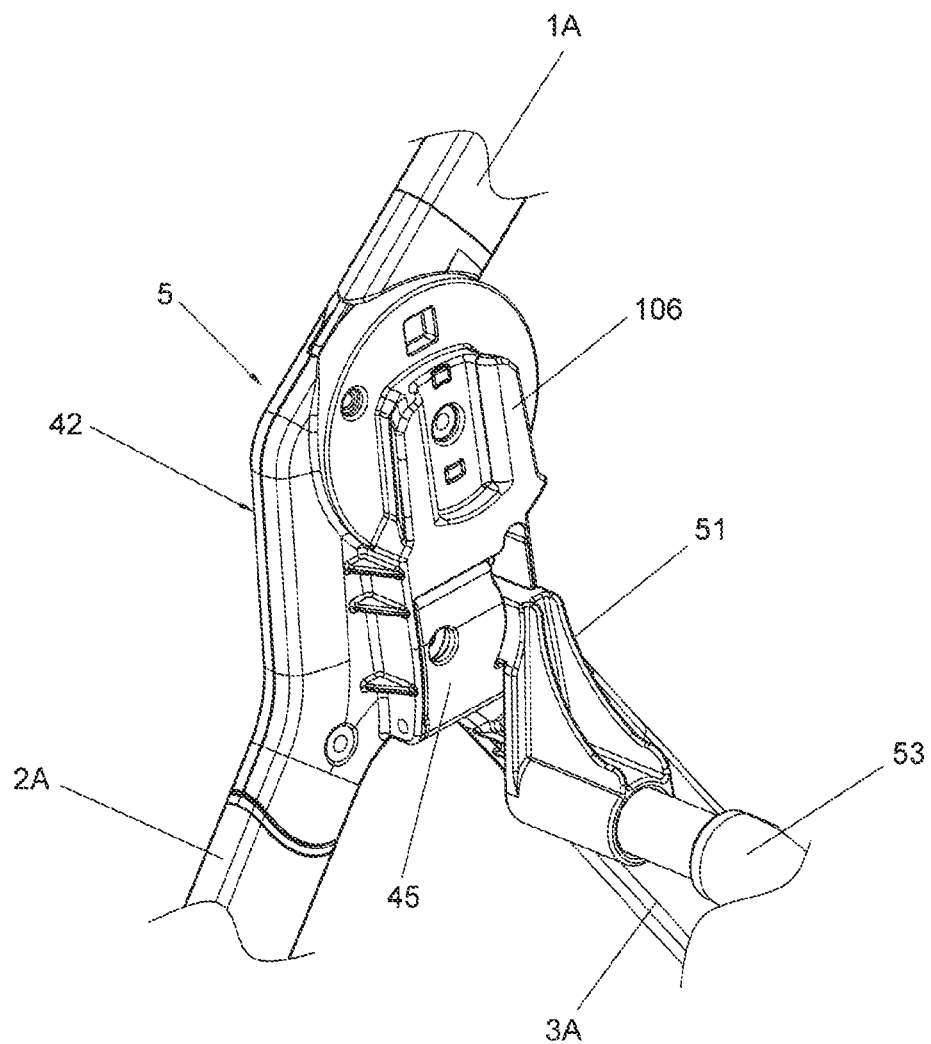
FIG. 8 is an enlarged view illustrating a joint structure used in the child stroller apparatus shown in FIG. 7.
Figure 9:
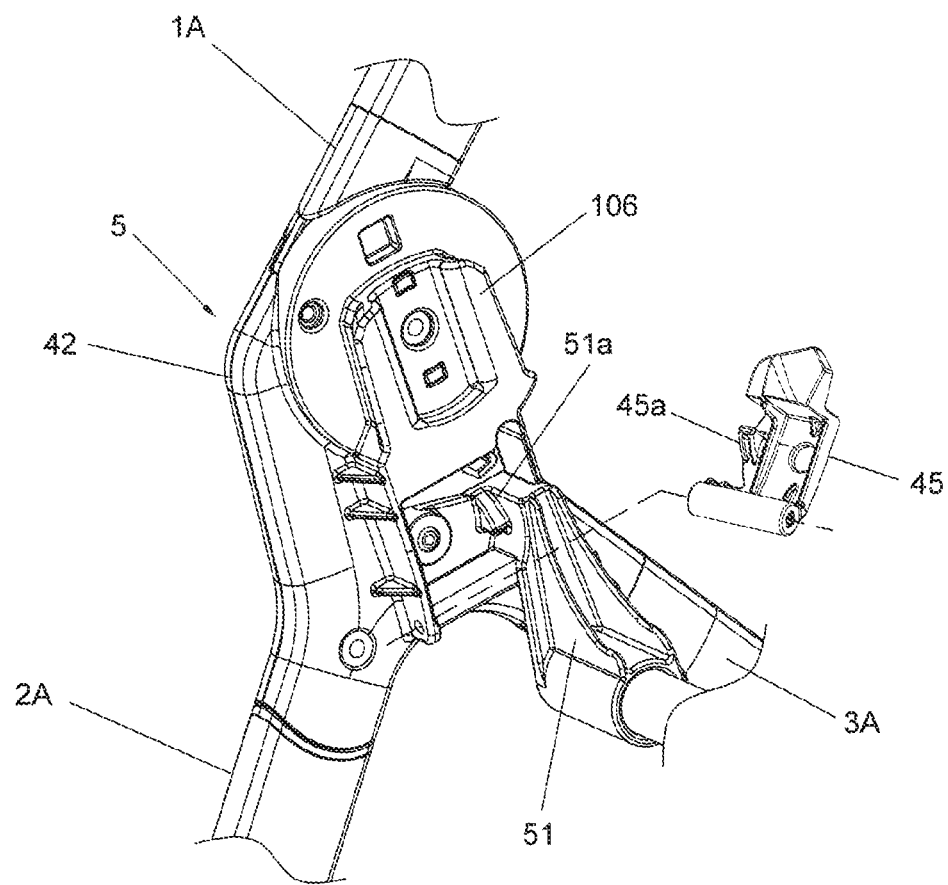
FIG. 9 is an exploded view illustrating a lock mechanism assembled with the joint structure shown in FIG. 8.
Figure 10:
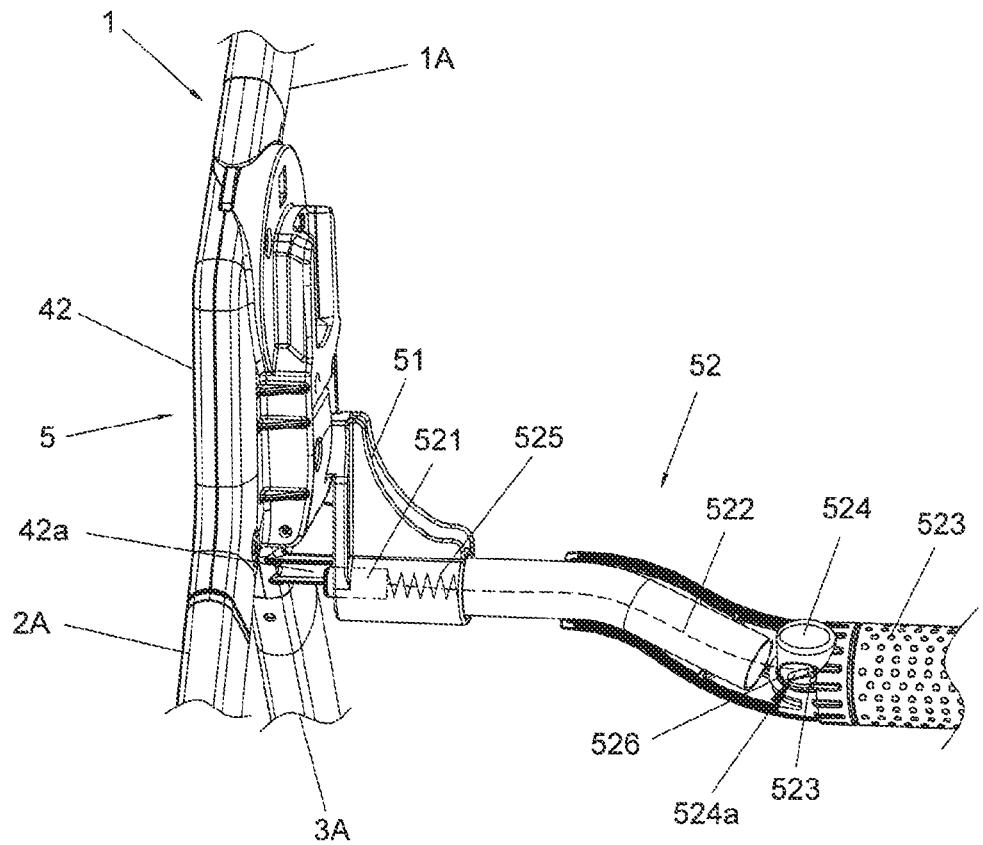
FIG. 10 is a schematic view illustrating a safety lock mechanism disposed adjacent to the joint structure shown in FIG. 8 for preventing accidental folding of the child stroller apparatus.

Referring to FIGS. 7 and 10, the child stroller apparatus 200 may further include a safety lock mechanism 52 coupled with at least one release actuator 51. The safety lock mechanism 52 can include an impeding part 521, a cable 522, a slider 523, a release part 524 and two springs 525 and 526. The impeding part 521 may include a pin shape, and is slidably assembled with the release actuator 51. The impeding part 521 can slide relative to the release actuator 51 to protrude sideways outward for engaging with a stop portion 421a affixed on the shell 42, or to retract inward for disengaging from the stop portion 42a. The engagement of the impeding part 521 with the stop portion 42a can block upward displacement of the release actuator 51, which thereby prevents inadvertent movement of the release actuator 51 that would result in accidental unlocking of the latch 45.

The spring 525 can bias the impeding part 521 for engagement with the stop portion 42a of the shell 42. According to an example of assembly, the spring 525 can have a first end anchored with the impeding part 521, and a second end anchored with the release actuator 51 or transversal bar assembly 53.

The release part 524 can be disposed on the transversal bar assembly 53, and can be operatively connected with the impeding part 521 via the cable 522. According to an example of construction, the release part 524 can be provided as button, and can be slidably connected with the transversal bar assembly 53. The release part 524 can have a guide slot 524a through which the slider 523 is guided for sliding movement. The cable 522 can have two opposite ends respectively anchored with the impeding part 521 and the slider 523, and can be disposed through a hollow interior of the transversal bar assembly 53. When the release part 524 is depressed, it can urge the slider 523 to move and pull on the cable 522, which in turn can pull the impeding part 521 against the biasing force of the spring 525 for disengaging from the stop portion 42a of the shell 42.

The spring 526 can be respectively connected with the release part 524 and the transversal bar assembly 53. When no external pressure is applied on the release part 524, the spring 526 can urge the release part 524 to protrude outward the transversal bar assembly 53.

When the child stroller apparatus 200 is locked in the unfolded state by the latch 45 at each of the left and right sides, the impeding part 521 can engage with the stop portion 42a of one shell 42 and thereby block displacement of the release actuator 51 in the unlocking direction. As a result, accidental folding of the child stroller apparatus 200 can be prevented.

For folding the child stroller apparatus 200, a caregiver first presses on the release part 524 against the biasing force of the spring 526, which results in the impeding part 521 moving and disengaging from the stop portion 42a of the shell 42, thereby unlocking the release actuator 51. While the release part 524 is kept depressed, the caregiver then can pull the transversal bar assembly 53 upward with the same hand, which urges the release actuator 51 to move in unison and cause unlocking displacement of the latch 45. The unlocked child stroller apparatus 200 then can be folded like previously described.

FIGS. 11-16 are schematic views illustrating another construction of a mechanism for locking the child stroller apparatus in the unfolded state. Referring to FIGS. 11-16, the respective side segments 1A, 2A and 3A of the handle frame 1, front leg frame 2 and rear leg frame 3 at each of the left and right sides can be connected with one joint structure 6, which may exemplarily substitute for the joint structure 5 in the above-described child stroller apparatus 200. Like previously described, the joint structure 6 can include the shell 42, which is fixedly attached to the side segment 3A of the rear leg frame 3 and is pivotally connected with the coupling part 41 of the side segment 1A and the coupling part 44 of the side segment 2A about two distinct pivot axes, and the linking member 43 that rotationally links the handle frame 1 to the front leg frame 2 and is received at least partially in the shell 42.

Referring to FIGS. 11, 13, 15 and 16, for locking the child stroller apparatus in the unfolded state, the shell 42 at each of the left and right sides can be assembled with a locking mechanism comprised of a latch 61 and an actuating arm 62. The latch 61 can be pivotally connected with the shell 42 and can have a locking notch 61*a*, and the coupling part 44 of the front leg frame 2 can be fixedly connected with a pin 44*a* disposed eccentric from its pivot axis. The latch 61 is rotatable to cause the notch 61*a* to engage with the pin 44*a* for locking the joint structure 6 and the child stroller apparatus in the unfolded state, or to cause the notch 61*a* to disengage from the pin 44*a* for unlocking the joint structure 6 and allowing folding rotation of the handle frame 1, front leg frame 2 and rear leg frame 3.

The actuating arm 62 is exposed outside the shell 42 and is respectively connected pivotally with the shell 42 and the latch 61 about two distinct pivot axes, the pivot connection of the actuating arm 62 with the latch 61 being radially separate from the pivot connection of the latch 61 with the shell 42. Moreover, the actuating arm 62 may be attached to a transversal bar assembly 60, which can extend across a width of the child stroller apparatus. The transversal bar assembly 60 may have two opposite ends respectively attached to the two actuating arms 62 on the left and right sides of the child stroller apparatus. A caregiver can pull the transversal bar assembly 60 upward, which results in concurrent rotation of the actuating arms 62 in a first direction relative to the shells 42, which in turn urge the two latches 61 to rotate in unison and disengage from the coupling parts 44 for unlocking the child stroller apparatus and allowing its folding. Reversely, the transversal bar assembly 60 can be displaced downward (e.g., by gravity action) to cause concurrent rotation of the actuating arms 62 relative to the shells 42 in a second direction opposite to the first direction, which in turn urge the two latches 61 to rotate in unison and engage with the coupling parts 44 for locking the child stroller apparatus in the unfolded state.

Figure 11:
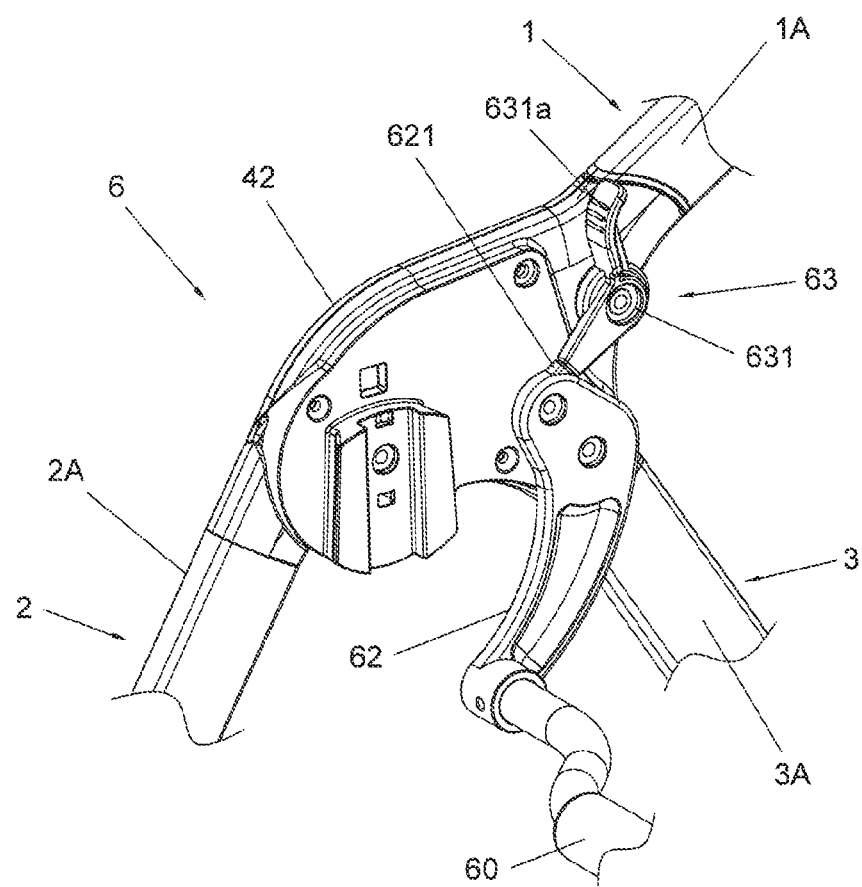
FIG. 11 is a schematic view illustrating another joint structure used in a child stroller apparatus and a safety lock mechanism disposed adjacent to the joint structure for preventing accidental folding of the child stroller apparatus.
Figure 12:
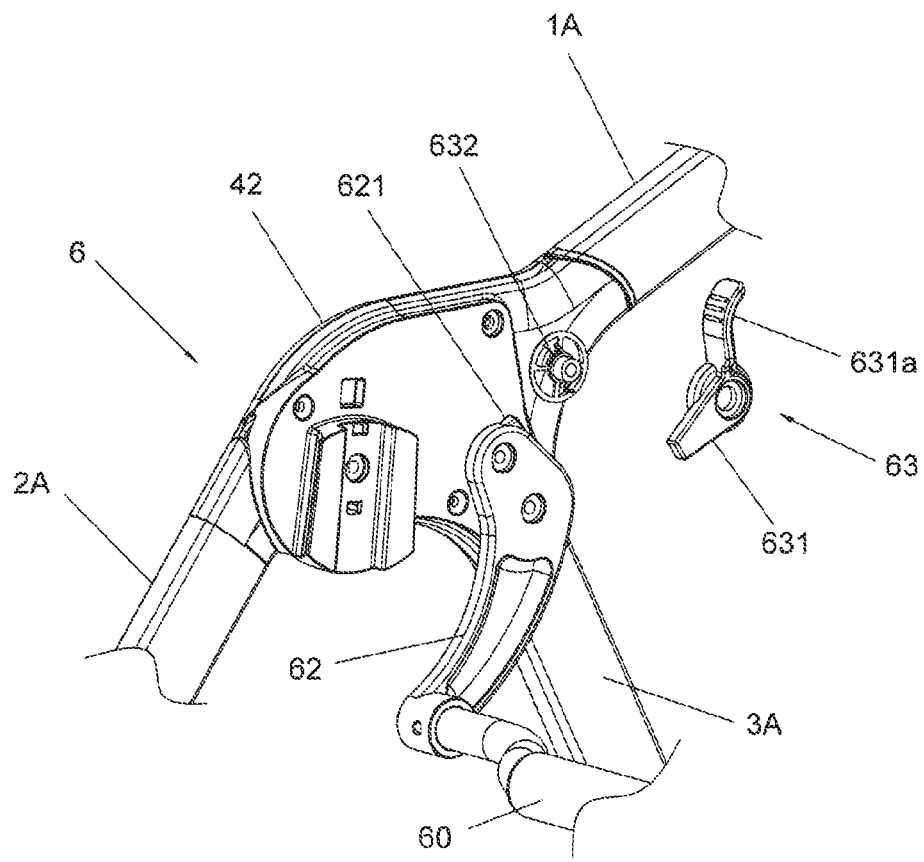
FIG. 12 is an exploded view of the safety lock mechanism shown in FIG. 11.
Figure 13:
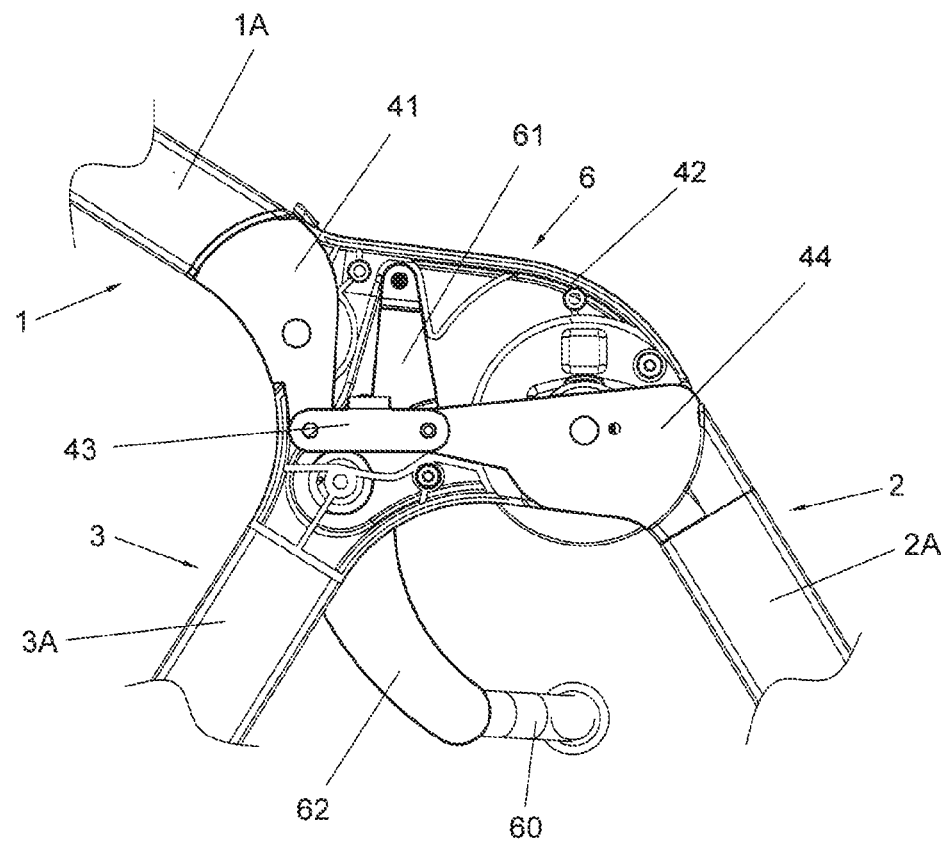
FIG. 13 is a schematic view illustrating some inner construction details of the joint structure of FIG. 11 locked in an unfolded state.
Figure 14:
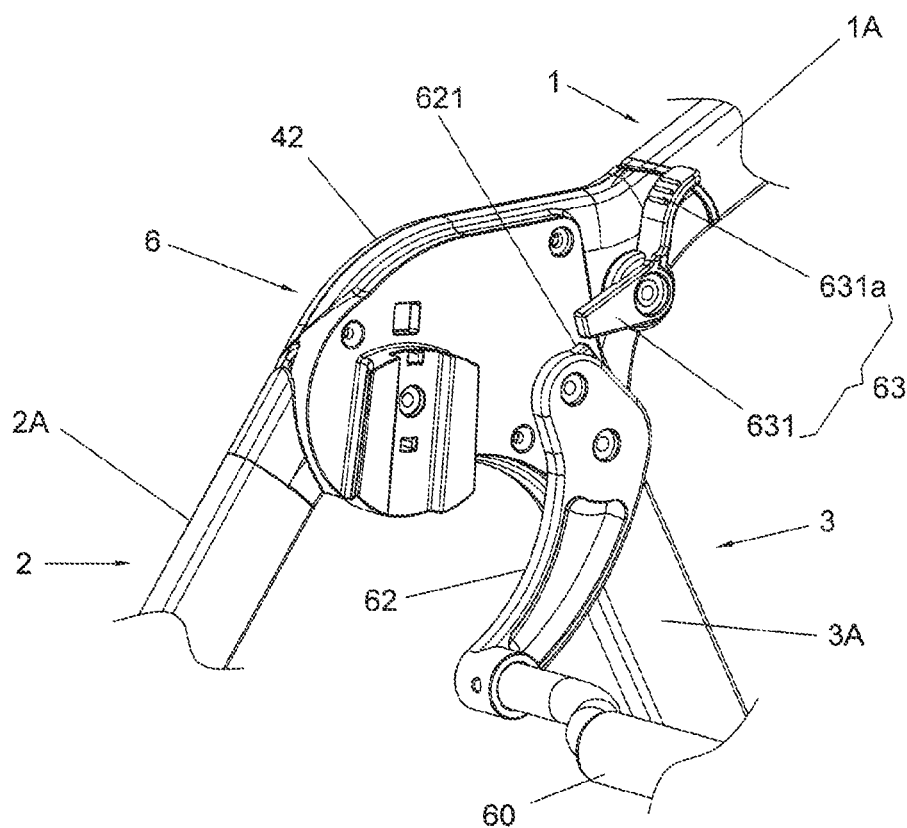
FIG. 14 is a perspective view illustrating the safety lock mechanism shown in FIG. 11 in an unlocking state.
Figure 15:
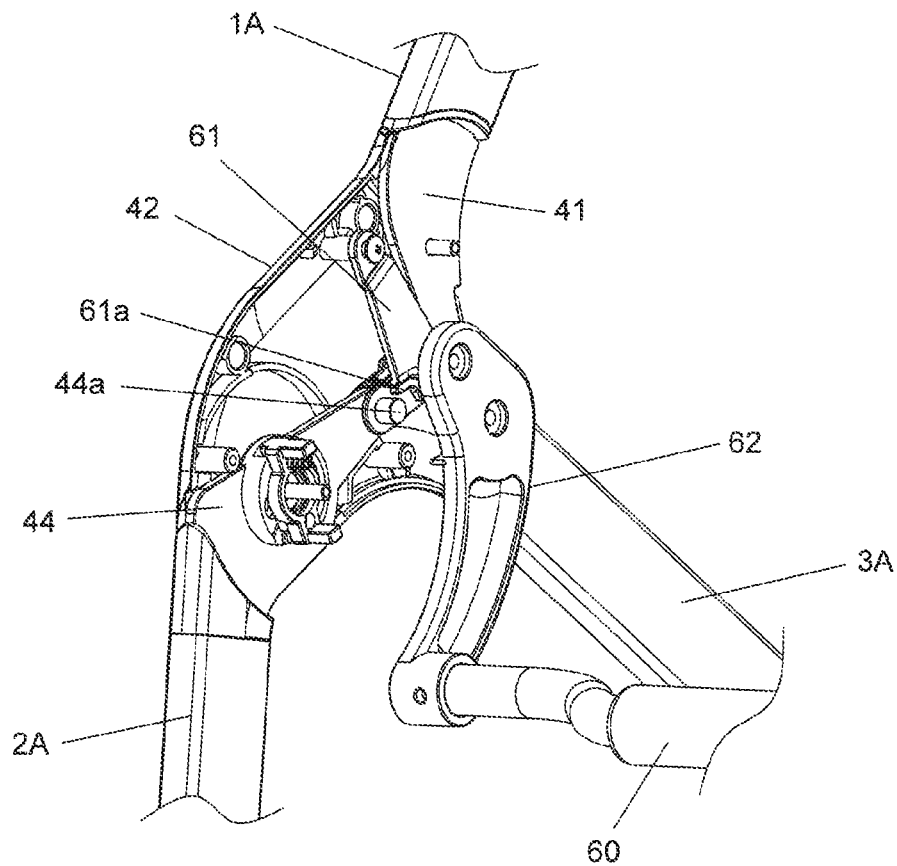
FIG. 15 is a schematic view illustrating some inner construction details of the joint structure of FIG. 11 represented in an unlocked state.
Figure 16:
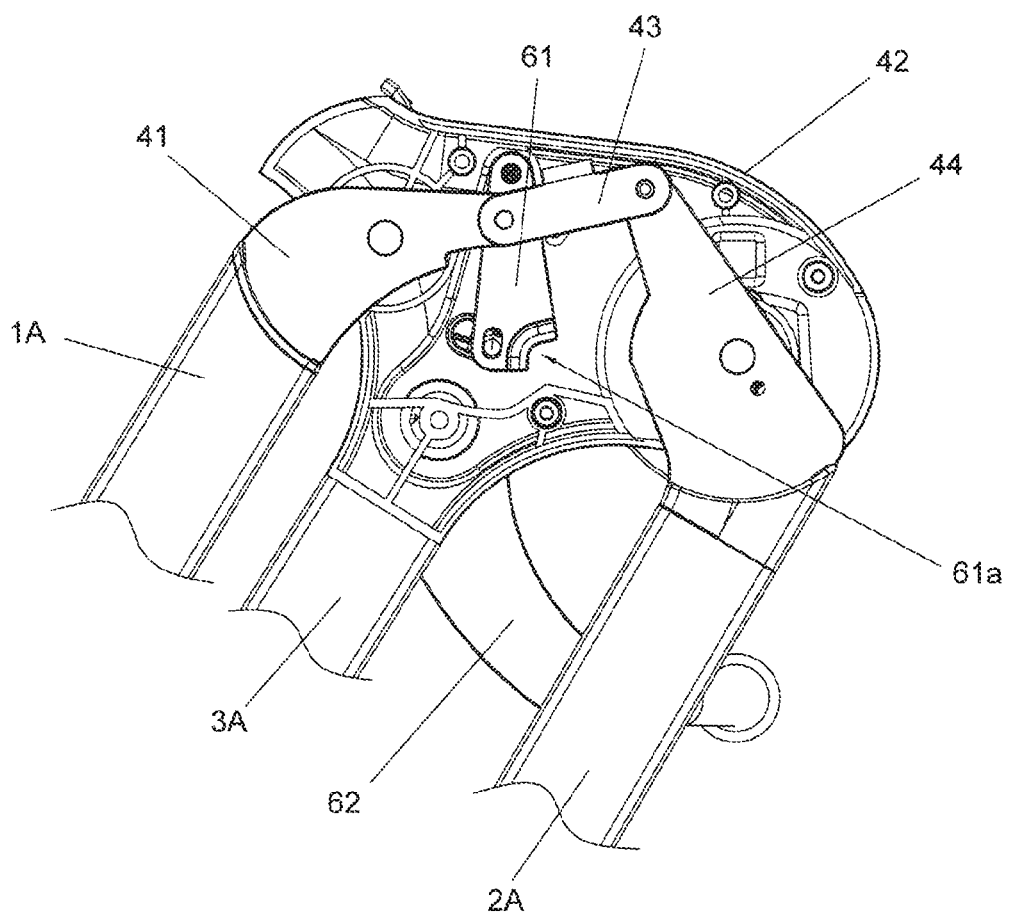
FIG. 16 is a schematic view illustrating some inner construction details of the joint structure of FIG. 11 represented in a folded state.

Referring to FIGS. 11, 12 and 14, a safety lock mechanism 63 may be further provided to prevent accidental unlocking of the child stroller apparatus. The safety lock mechanism 63 can include an impeding part 631 and a spring 632. The impeding part 631 can be pivotally connected with the shell 42, and can have an operation portion 631*a* exposed outward. The impeding part 631 is rotatable to engage or disengage the actuating arm 62. The spring 632 can have two ends respectively connected with the impeding part 631 and the shell 42, and can bias the impeding part 631 to engage with the actuating arm 62. In one example of construction, the spring 632 can be a torsion spring assembled about the pivot axis of the impeding part 631. The safety lock mechanism 63 may be provided at only one of the left and right sides.

While the latch 61 remains engaged with the coupling part 44 and thereby locks the joint structure 6 in the unfolded state of the child stroller apparatus, the impeding part 631 biased by the spring 632 can engage with an eccentric portion 621 of the actuating arm 62 so as to block its rotation in a direction that would urge unlocking displacement of the latch 61. Since the latch 61 and the actuating arm 62 are rotationally linked to each other, this interference between the impeding part 631 and the actuating arm 62 can effectively prevent accidental unlocking of the latch 61.

For folding the child stroller apparatus, a caregiver first presses on the operation portion 631*a* of the impeding part 631, which causes its rotation relative to the shell 42 for disengaging from the actuating arm 62, thereby allowing rotation of the actuating arm 62. Then the caregiver can pull the transversal bar assembly 60 upward, which drives rotation of the two actuating arms 62 relative to the shells 42 and thereby urge the two latches 61 to rotate and disengage from the coupling parts 44 for unlocking the child stroller apparatus. The unlocked child stroller apparatus then can be folded like described previously.

Figure 17:
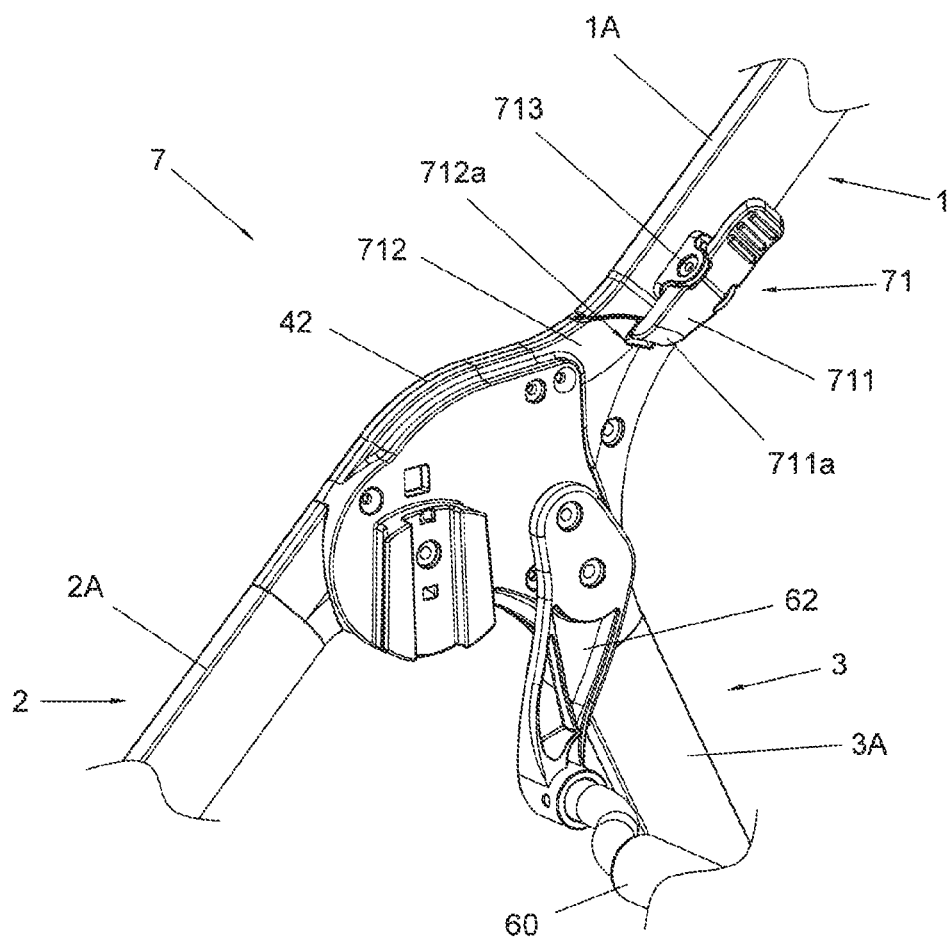
FIG. 17 is a perspective view illustrating another safety lock mechanism disposed adjacent to the joint structure for preventing accidental folding of the child stroller apparatus.
Figure 18:
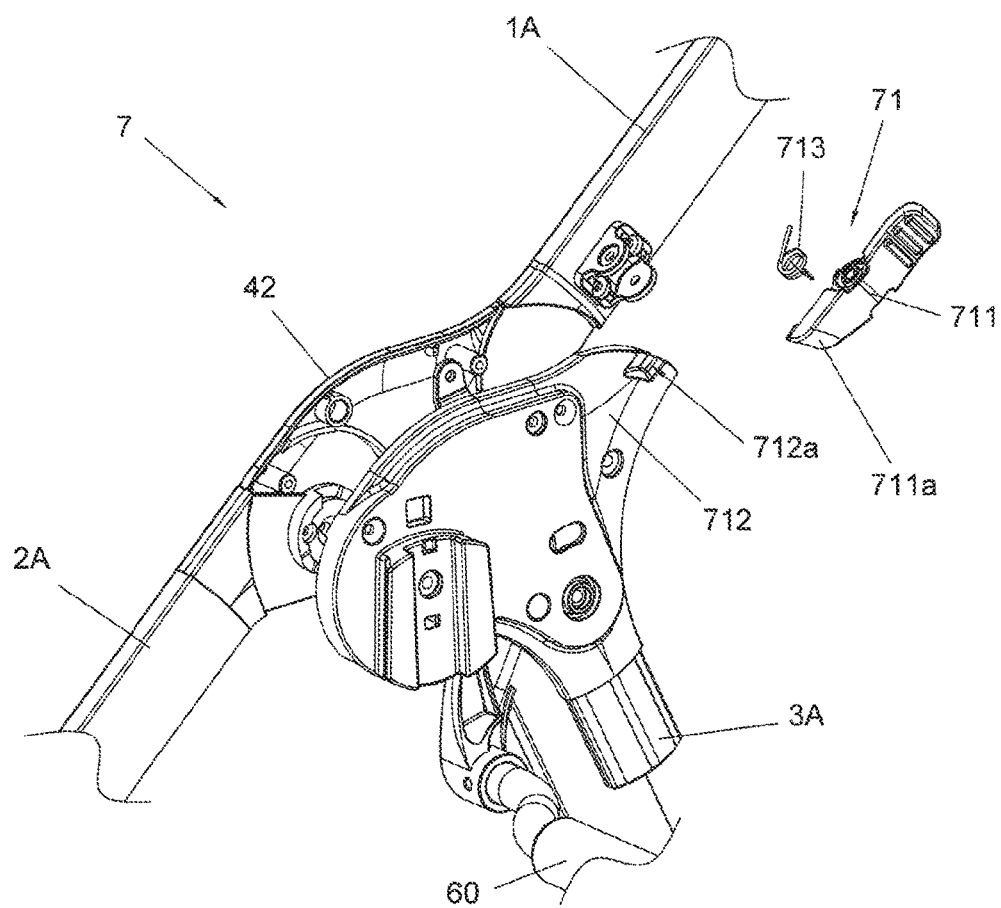
FIG. 18 is an exploded view illustrating the construction of the safety lock mechanism shown in FIG. 17.

In conjunction with FIGS. 15 and 16, FIGS. 17 and 18 are schematic views illustrating another construction of a safety lock mechanism 71 for preventing accidental folding of the child stroller apparatus. Referring to FIGS. 17 and 18, the respective side segments 1A, 2A and 3A of the handle frame 1, front leg frame 2 and rear leg frame 3 at each of the left and right sides can be connected with one joint structure 7. Like previously described, the joint structure 7 can include the shell 42, which is fixedly attached to the side segment 3A of the rear leg frame 3 and is pivotally connected with the side segments 1A and 2A (e.g., via the coupling parts 41 and 44 like previously described in connection with FIGS. 15 and 16) about two distinct pivot axes, and the handle frame 1 and front leg frame 2 may be rotationally linked to each other (e.g., via the linking member 43 like previously described in connection with FIGS. 15 and 16). Moreover, the shell 42 may be assembled with the actuating arm 62 and the latch 61 (not shown in FIGS. 17 and 18) like described previously, the actuating arm 62 being attached to the transversal bar assembly 60 and being operable to cause unlocking of the latch 61.

The safety lock mechanism 71 can include an impeding part 711 and a spring 713. The impeding part 711 may be exposed outward, and may be assembled with the side segment 1A of the handle frame 1 at a location adjacent to the shell 42. According to an example of construction, the impeding part 711 may be pivotally connected with the side segment 1A of the handle frame 1, and can have a tongue 711*a*. The impeding part 711 is operable independent from the actuating arm 62 and the latch 61, and can rotate relative to the handle frame 1 to cause the tongue 711*a* to engage with a recess 712*a* provided on an ear portion 712 fixedly connected with the shell 42. The spring 713 can be connected with the impeding part 711, and can bias the impeding part 711 for engaging the tongue 711*a* thereof with the ear portion 712 of the shell 42. According to an example of implementation, the safety lock mechanism 71 may be provided at only one of the left and right sides.

While the child stroller apparatus is locked in the unfolded state, the impeding part 711 can engage with the ear portion 712 of the shell 42. Rotation of the handle frame 1 in the folding direction can be thereby prevented, even if the transversal bar assembly 60 were pulled upward in the unlocking direction. For folding the child stroller apparatus, a caregiver first rotates the impeding part 711 so as to disengage the tongue 711a thereof from the ear portion 712 of the shell 42, thereby unlocking the handle frame 1 with respect to the shell 42. Then the caregiver can pull the transversal bar assembly 60 upward, which drives rotation of the two actuating arms 62 relative to the shells 42 and urge the two latches 61 to rotate and disengage from the coupling parts 44 for unlocking the child stroller apparatus, like previously described. The unlocked child stroller apparatus then can be folded like described previously.

Figure 19:
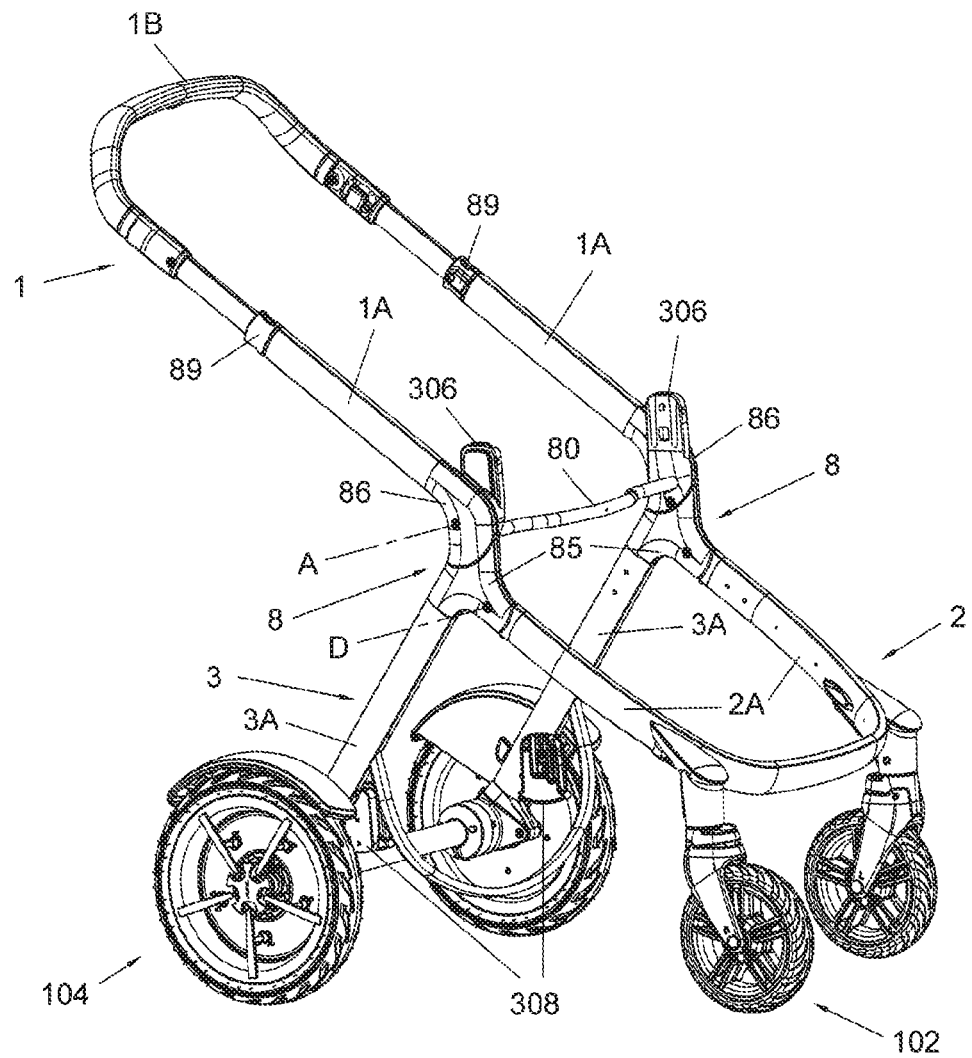
FIG. 19 is a perspective view illustrating another embodiment of a child stroller apparatus.
Figure 20:
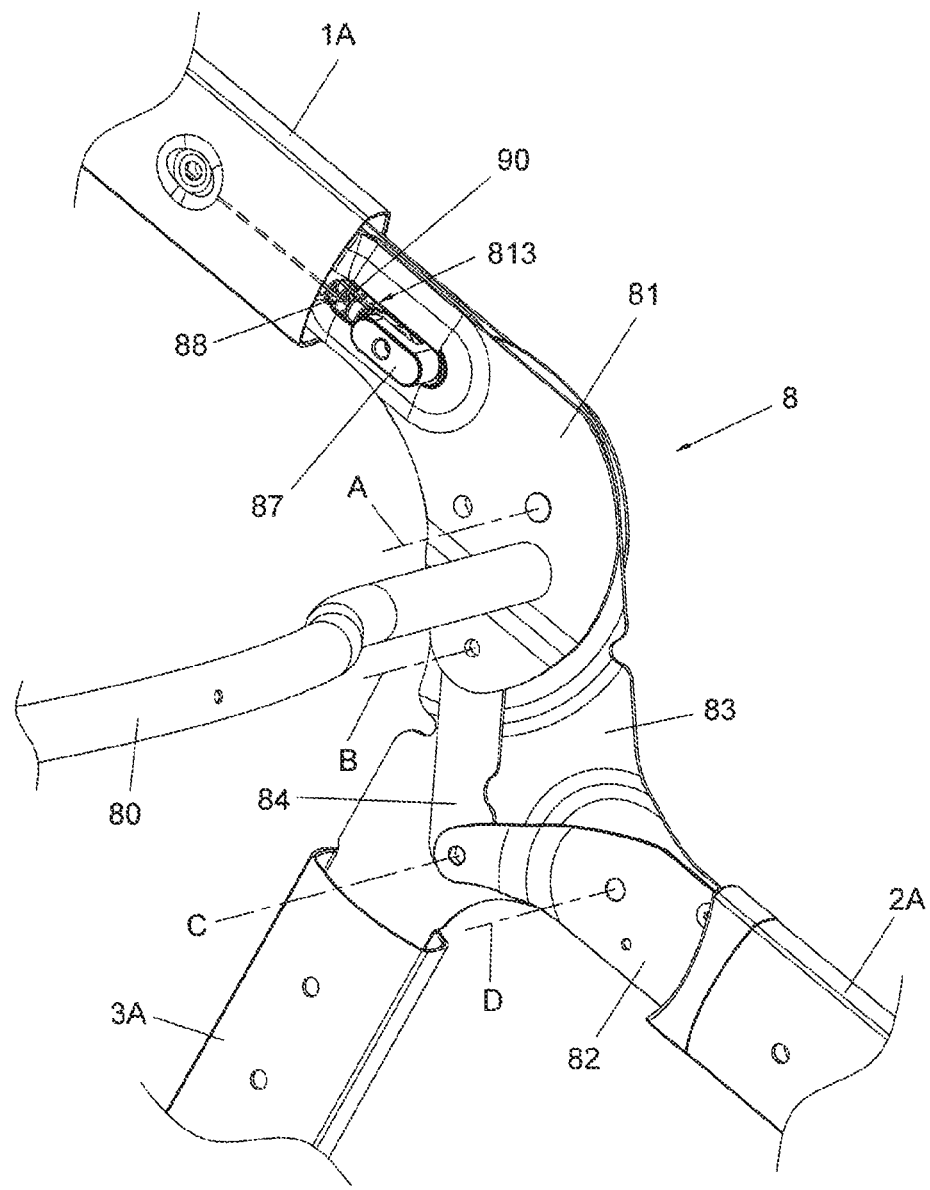
FIG. 20 is a schematic view illustrating some inner construction details of a joint structure in the child stroller apparatus shown in FIG. 19, the representation illustrated in FIG. 2 being from an inner side of the child stroller apparatus.
Figure 21:
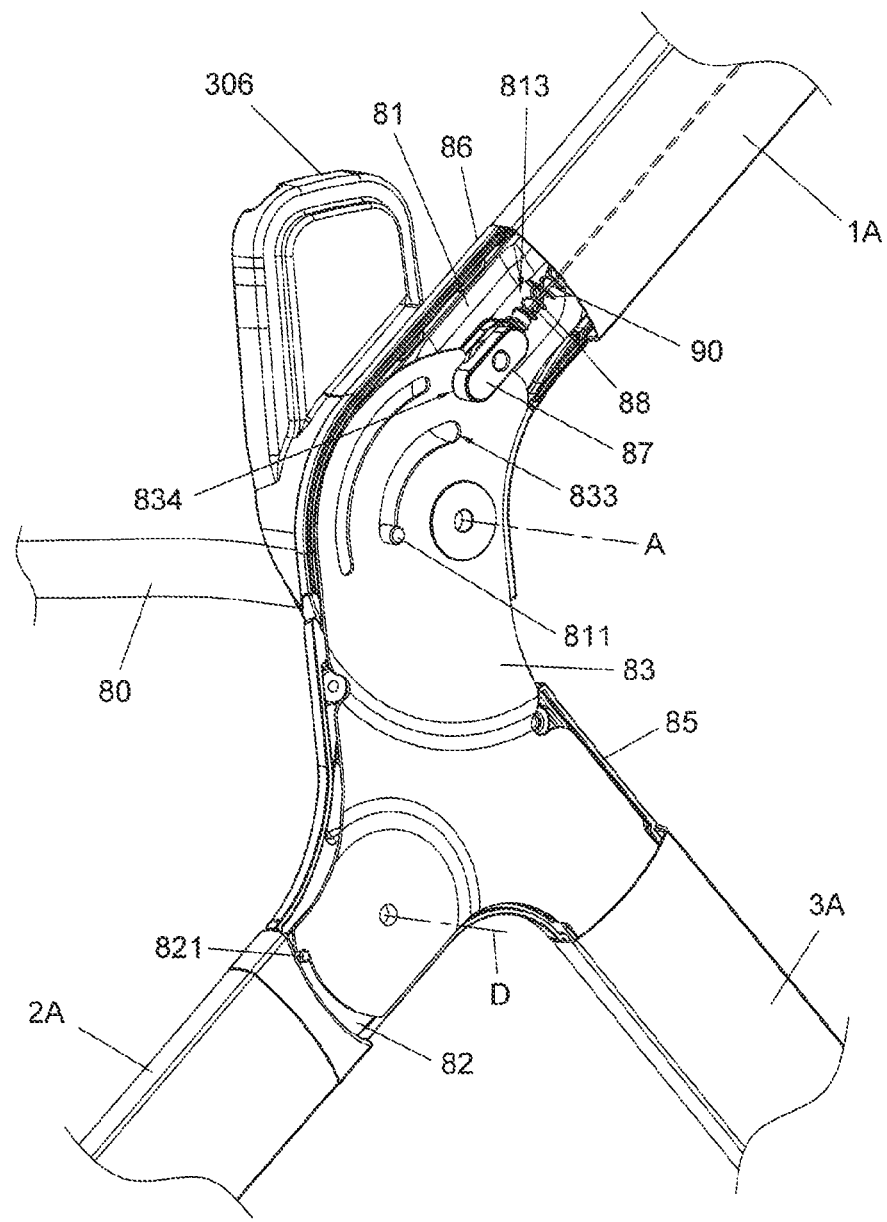
FIG. 21 is a schematic view illustrating some inner construction details of the joint structure of FIG. 20 represented from an outer side of the child stroller apparatus.

FIGS. 19-21 are schematic views illustrating another embodiment of a child stroller apparatus 300. The child stroller apparatus 300 has a frame structure generally similar to that described previously, including the handle frame 1 having two side segments 1A, the front leg frame 2 having two side segments 2A, and the rear leg frame 3 having two side segments 3A. The front and rear leg frames 2 and 3 are respectively provided with wheel assemblies 102 and 104. The side segments 1A, 2A and 3A at each of the left and right sides are connected with one joint structure 8. The two joint structures 8 on the left and right sides are generally similar in construction, and allow relative rotation between the handle frame 1, front leg frame 2 and rear leg frame 3 for folding and unfolding the child stroller apparatus 300.

Referring to FIGS. 20 and 21, the joint structure 8 can include three coupling parts 81, 82 and 83 that are respectively connected fixedly with the side segment 1A of the handle frame 1, the side segment 2A of the front leg frame 2 and the side segment 3A of the rear leg frame 3. The coupling parts 81, 82 and 83 can include, e.g., plate elements made of a metallic material. The coupling part 81 of the handle frame 1 is pivotally connected with the coupling part 83 of the rear leg frame 3 about the pivot axis A, and the coupling part 82 of the front leg frame 2 is pivotally connected with the coupling part 83 of the rear leg frame 3 about the pivot axis D. The coupling part 83 of the rear leg frame 3 can have an arcuate guide slot 833 centered on the pivot axis A, the coupling part 81 of the handle frame 1 can have a pin 811 slidably assembled through the guide slot 833. The course of the pin 811 along the guide slot 833 can limit a range of rotational movement of the handle frame 1 relative to the rear leg frame 3. Moreover, the coupling part 82 can be fixedly attached with a pin 821, which can abut against the coupling part 83 while the front leg frame 2 is unfolded relative to the rear leg frame 3. The pin 821 can likewise limit the course of rotation of the front leg frame 2.

Like described in the previous embodiments, the coupling part 81 of the handle frame 1 is linked to the coupling part 82 of the front leg frame 2 via a linking member 84. The linking member 84 can be a unitary part having an elongated shape. A first end portion of the linking member 84 can be pivotally connected with the coupling part 81 about the pivot axis B, and a second end portion of the linking member 84 opposite to its first end portion can be pivotally connected with the coupling part 82 about the pivot axis C. With this assembly, the handle frame 1 and the coupling part 81 attached thereto are rotatable about the pivot axis A relative to the rear leg frame 3 and the coupling part 83 attached thereto, and the front leg frame 2 and the coupling part 82 attached thereto are rotatable about the pivot axis D relative to the rear leg frame 3 and the coupling part 83, the handle frame 1 and the front leg frame 2 being rotationally linked to each other owing to the connection of the linking member 84. Accordingly, the handle frame 1 and the front leg frame 2 can rotate in unison in opposite directions either toward the rear leg frame 3 for folding the child stroller apparatus 100, or away from the rear leg frame 3 for unfolding the child stroller apparatus 100.

Referring to FIGS. 19 and 21, the joint structure 8 can further include a shell 85 fixedly connected with the side segment 3A of the rear leg frame 3, and another shell 86 fixedly connected with the side segment 1A of the handle frame 1 and pivotally connected with the shell 85 about the pivot axis A. The shell 85 can have a hollow interior in which the coupling parts 82 and 83 are at least partially received and assembled, and the shell 86 can have a hollow interior in which the coupling parts 81 and 83 are at least partially received and assembled. The linking member 84 is received at least partially in the shells 85 and 86, the pivot connection of the linking member 84 about the pivot axis C being received in the shell 85, and the pivot connection of the linking member 84 about the pivot axis B being received in the shell 86. During rotation of the handle frame 1 and the front leg frame 2 between the folded and unfolded states, the linking member 84 can remain at least partially inside the shells 85 and 86, the pivot connection of the linking member 84 about the pivot axis C moving and remaining inside the shell 85. This can add protection, and provide a compact and robust construction for the joint structure 8.

Referring to FIGS. 20 and 21, a latch 87 may be movably assembled with the coupling part 81 of the handle frame 1, and can be operable to engage or disengage the coupling part 83 of the rear leg frame 3 for locking or unlocking the child stroller apparatus 300. According to an example of construction, the coupling part 81 may have an elongated slot 813, and the latch 87 may be assembled for sliding movement along the elongated slot 813. The latch 87 can slide relative to the coupling part 81 to engage with a groove 834 provided on the coupling part 83 of the rear leg frame 3, which can block a folding rotation of the handle frame 1 about the pivot axis A and thereby lock the child stroller apparatus 300 in the unfolded state. Moreover, the latch 87 can slide relative to the coupling part 81 to disengage from the groove 834 of the coupling part 83, which unlocks the child stroller apparatus 300 and allows rotation of the handle frame 1 about the pivot axis A for folding the child stroller apparatus 300. The latch 87 can move in unison with the handle frame 1 when it is rotated about the pivot axis A in a folding or unfolding direction.

The latch 87 can be connected with a spring 88, which can bias the latch 87 toward a locking state for engagement with the coupling part 83 of the rear leg frame 3. The spring 88 may exemplary be a compression spring having two ends respectively connected with the latch 87 and the coupling part 81.

Referring to FIGS. 19-21, the latch 87 can be further connected with a release actuator 89 via a cable 90. The release actuator 89 can be exemplary assembled slidably with the handle frame 1 (e.g., on an upper end of the side segment 1A), and the cable 90 can be routed along the side segment 1A and have two opposite ends respectively anchored with the release actuator 89 and the latch 87. A caregiver can thereby operate the release actuator 89 to urge the latch 87 to slide against the biasing force of the spring 88 and disengage from the coupling part 83 for unlocking the child stroller apparatus 300 and allowing its folding.

A same assembly of the latch 87, spring 88, cable 90 and release actuator 89 as described above can be similarly provided on the left and right sides of the child stroller apparatus 300 to achieve locking and unlocking of the child stroller apparatus 300.

Referring again to FIG. 19, the child stroller apparatus 300 can further include two seat mounts 306 on which a child seat can be detachably installed. The seat mounts 306 may be respectively attached fixedly to the two shells 86 of the handle frame 1.

Additional seat mounts 308 may be further provided on the two side segments 3A of the rear leg frame 3 close to the wheel assemblies 104. In addition, a transversal bar 80 extending across a width of the child stroller apparatus 300 may also be fixedly connected with the two shells 86. The transversal bar 80 may be grasped with one hand for facilitating carrying of the child stroller apparatus 300 in the folded state.

Advantages of the child stroller apparatuses described herein include the ability to provide compact joint structures for connecting the handle frame, the front leg frame and the rear leg frame, which allow convenient folding and unfolding of the child stroller apparatuses. Moreover, the ability to integrate various elements such as linking members and latches in the joint structures can offer a simpler and more appealing appearance of the child stroller apparatus.

Realization of the child stroller apparatuses has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller apparatus comprising:
    a handle frame having a first side segment fixedly connected with a first coupling part;
    a front leg frame having a second side segment fixedly connected with a second coupling part;
    a rear leg frame having a third side segment fixedly connected with a shell, the third side segment being respectively connected pivotally with the first and second coupling parts;
    a linking member received at least partially inside the shell and respectively connected pivotally with the first and second coupling parts about two different pivot axes, the handle frame and the front leg frame being thereby rotationally linked to each other;
    a latch disposed adjacent to the first coupling part, the latch being operable to rotationally lock the handle frame with respect to the rear leg frame so as to lock the infant stroller apparatus in an unfolded state, wherein the latch is assembled with the shell and is movable to engage with or disengage from the first coupling part; and
    an actuating arm that is exposed outside the shell and is pivotally connected with the latch, the actuating arm and the latch further being respectively connected pivotally with the shell, a rotation of the actuating arm in one direction urging the latch to rotate and disengage from the first coupling part.

2. The child stroller apparatus according to claim 1, wherein the linking member is pivotally connected with the second coupling part via a pivot connection, the pivot connection moving inside the shell when the child stroller apparatus is switched between the unfolded state and a folded state.

3. The child stroller apparatus according to claim 1, wherein the linking member is respectively connected pivotally with the first and second coupling parts via two pivot connections, the two pivot connections moving inside the shell when the child stroller apparatus is switched between the unfolded state and a folded state.

4. The child stroller apparatus according to claim 1, further including a seat mount fixedly attached to the shell, the seat mount being configured to receive a detachable installation of a child seat.

5. The child stroller apparatus according to claim 1, further including a safety lock mechanism configured to prevent accidental folding of the child stroller apparatus, the safety lock mechanism including an impeding part connected with the shell, the impeding part being movable to engage or disengage the actuating arm, an engagement of the impeding part with the actuating arm blocking movement of the actuating arm in a direction that causes unlocking of the latch.

6. The child stroller apparatus according to claim 1, further including a safety lock mechanism configured to prevent accidental folding of the child stroller apparatus, the safety lock mechanism including an impeding part exposed outward and assembled with the first side segment, the impeding part being operable independent from the latch, an engagement of the impeding part with the shell blocking rotation of the handle frame in a folding direction.

7. A child stroller apparatus comprising:
    a handle frame having a first side segment fixedly connected with a first coupling part;
    a front leg frame having a second side segment fixedly connected with a second coupling part;
    a rear leg frame having a third side segment fixedly connected with a shell, the third side segment being respectively connected pivotally with the first and second coupling parts;
    a linking member received at least partially inside the shell and respectively connected pivotally with the first and second coupling parts about two different pivot axes, the handle frame and the front leg frame being thereby rotationally linked to each other;
    a latch assembled with the shell, the latch being engaged with the first coupling part to lock the infant stroller apparatus in an unfolded state, and the latch disengaging from the first coupling part for folding of the child stroller apparatus;
    a release actuator movably assembled with the shell for rotational movement, the latch and the release actuator respectively having ramp surfaces in contact with each other, the release actuator being movable upward to cause an unlocking displacement of the latch for disengaging from the first coupling part; and
    a safety lock mechanism configured to prevent accidental folding of the child stroller apparatus, the safety lock mechanism including an impeding part assembled with the release actuator, the impeding part being movable relative to the release actuator to protrude outward and engage with the shell for blocking upward displacement of the release actuator, or to retract inward and disengage from the shell.

8. The child stroller apparatus according to claim 7, wherein the latch is connected with a spring, the spring biasing the latch to a locking state.

9. The child stroller apparatus according to claim 7, wherein the linking member is respectively connected pivotally with the first and second coupling parts via two pivot connections, the two pivot connections moving inside the shell when the child stroller apparatus is switched between the unfolded state and a folded state.

10. The child stroller apparatus according to claim 7, further including a seat mount fixedly attached to the shell, the seat mount being configured to receive a detachable installation of a child seat.

11. The child stroller apparatus according to claim 7, wherein the release actuator is further fixedly connected with a transversal bar assembly, and the safety lock mechanism further includes a release part that is disposed on the transversal bar assembly and is operatively connected with the impeding part via a cable, the release part being operable to urge the impeding part to move and disengage from the shell.

12. A child stroller apparatus comprising:
- a handle frame having a first side segment fixedly connected with a first coupling part;
- a front leg frame having a second side segment that is fixedly connected with a second coupling part;
- a rear leg frame having a third side segment that is fixedly connected with a third coupling part, the third coupling part being respectively connected pivotally with the first and second coupling parts;
- a first and a second shell respectively connected fixedly with the third coupling part and the first coupling part, the first coupling part being received at least partially in the second shell, the third coupling part being received at least partially in the first and second shells;
- a linking member received at least partially inside the first and second shells and respectively connected pivotally with the first and second coupling parts about two different pivot axes, the handle frame and the front leg frame being thereby rotationally linked to each other; and
- a latch assembled with the first coupling part, the latch being engaged with the third coupling part to lock the child stroller apparatus in an unfolded state, and the latch disengaging from the third coupling part for folding of the child stroller apparatus.

13. The child stroller apparatus according to claim 12, wherein the linking member is connected pivotally with the second coupling part via a pivot connection, the pivot connection moving inside the first shell when the child stroller apparatus is switched between the unfolded state and a folded state.

14. The child stroller apparatus according to claim 12, wherein the latch is slidably assembled with the first coupling part and is connected with a spring, the spring biasing the latch for engagement with the third coupling part.

15. The child stroller apparatus according to claim 12, further including a seat mount fixedly attached to the second shell, the seat mount being configured to receive a detachable installation of a child seat.

* * * * *